(12) United States Patent
Perez et al.

(10) Patent No.: US 8,021,642 B2
(45) Date of Patent: *Sep. 20, 2011

(54) CRYSTALLINE COMPOSITION, PREPARATION AND USE

(75) Inventors: Andres Quesada Perez, Caracas (VE); Gerardo Vitale Rojas, Edo. Miranda (VE)

(73) Assignee: Intevep, S.A., Caracas (VE)

( * ) Notice: Subject to any disclaimer, the term of this patent is extended or adjusted under 35 U.S.C. 154(b) by 1109 days.

This patent is subject to a terminal disclaimer.

(21) Appl. No.: 11/762,138

(22) Filed: Jun. 13, 2007

(65) Prior Publication Data

US 2007/0276175 A1    Nov. 29, 2007

Related U.S. Application Data

(63) Continuation of application No. 11/034,615, filed on Jan. 12, 2005, now Pat. No. 7,316,807.

(60) Provisional application No. 60/536,867, filed on Jan. 16, 2004.

(51) Int. Cl.
*C10G 11/04* (2006.01)
*C10G 11/05* (2006.01)
*C10G 47/04* (2006.01)

(52) U.S. Cl. ........... 423/709; 423/718; 502/60; 502/61; 502/73; 502/74; 208/110; 208/111.01; 208/111.25; 208/111.35; 208/112; 208/118; 208/119; 208/120.01; 208/120.25; 208/120.35; 208/121; 208/122; 208/123; 208/124

(58) Field of Classification Search ................. 423/709, 423/718; 502/60, 61, 73, 74; 208/110, 111.01, 208/111.25, 111.35, 112, 118, 119, 120.01, 208/120.25, 120.35, 121, 122, 123, 124

See application file for complete search history.

(56) References Cited

U.S. PATENT DOCUMENTS

| | | | | |
|---|---|---|---|---|
| 4,732,747 A * | 3/1988 | Garces | ........................ | 423/713 |
| 4,840,930 A * | 6/1989 | LaPierre et al. | ................ | 502/79 |
| 4,994,250 A * | 2/1991 | Occelli | ........................ | 423/705 |
| 5,185,137 A * | 2/1993 | Vaughan et al. | .............. | 423/702 |
| 5,491,119 A * | 2/1996 | Verduijn | ......................... | 502/74 |
| 5,534,239 A * | 7/1996 | Fajula et al. | .................. | 423/713 |
| 5,591,421 A | 1/1997 | Zones | | |
| 5,693,215 A | 12/1997 | Zones et al. | | |
| 6,117,411 A | 9/2000 | Takewaki et al. | | |
| 6,177,374 B1 | 1/2001 | Pradhan et al. | | |
| 7,316,807 B2 * | 1/2008 | Perez et al. | .................. | 423/718 |

* cited by examiner

*Primary Examiner* — David M Brunsman
(74) *Attorney, Agent, or Firm* — Bachman & LaPointe, P.C.

(57) ABSTRACT

A porous crystalline composition having a molar composition as follows: $YO_2$:m $X_2O_3$:n ZO, wherein Y is a tetravalent element selected from the group consisting of silicon, germanium, tin, titanium and combinations thereof, X is a trivalent element selected from the group consisting of aluminum, gallium, boron, iron and combinations thereof, Z is a divalent element selected from the group consisting of magnesium, zinc, cobalt, manganese, nickel and combinations thereof, m is between about 0 and about 0.5, n is between about 0 and about 0.5; and the composition has an x-ray diffraction pattern which distinguishes it from the materials. A process for making the composition, and a process using the composition to treat an organic compound are also provided.

8 Claims, 5 Drawing Sheets

CRYSTALLINE COMPOSITION, PREPARATION AND USE

CROSS REFERENCE TO RELATED APPLICATIONS

This application is the U.S. Continuation Application of U.S. application Ser. No. 11/034,615 filed Jan. 12, 2005, now U.S. Pat. No. 7,316,807, which is based on Provisional Application Ser. No. 60/536,867 filed Jan. 16, 2004.

BACKGROUND OF THE INVENTION (1) Field of the Invention

The present invention relates to a novel synthetic crystalline material, designated IPZ-K, a method to produce such a material and its composition with other chemical elements such as magnesium, aluminum, gallium, boron, iron, zinc, cobalt, manganese, nickel, and mixtures thereof. The invention further relates to the use of this composition in processes of catalytic conversion of organic compounds, or as a sorbent.

(2) Description of the Related Art

Zeolites are crystalline aluminosilicates having as a fundamental unit a tetrahedral complex consisting of $Si^{4+}$ and $Al^{3+}$ in tetrahedral coordination with four oxygen atoms. Shared oxygen atoms link those tetrahedral units of [SiO4] and [AlO4]- to each other and in this way they form three-dimensional networks. The building of such networks produces channels and cavities of molecular dimensions. Water molecules and charged compensating cations are found inside the channels and cavities of the zeolitic networks.

Even though there was much knowledge about zeolites and their catalytic and adsorptive properties, it was not until the middle of the last century that commercial preparation and use of zeolites was possible. This advance allowed more research into the synthesis and modification of zeolitic materials producing a large number of new structures and materials. The incorporation into the synthesis gel of other compounds (organic and/or inorganic) to produce zeolitic molecular sieves allowed an important advance in this area of research. This variation not only has modified the physical-chemical properties of the zeolitic materials of known structures, but also, it has given rise to the production of new structures unknown in the aluminosilicate frameworks.

Organic additives or "templates" are known to produce new zeolitic materials, however, a simple template may lead to the crystallization of multiple structures. An example of this is the tetraethylammonium ion ($TEA^+$) which can produce different zeolitic frameworks like BEA, MFI, MTW, AFI, MOR or VET (using the three letter codes proposed by IUPAC and adopted for each framework type by the International Zeolite Association (IZA)). Even though the same organic additive can produce several distinct zeolitic frameworks, use of appropriate reaction mixture and synthesis conditions can produce the desired framework.

For some particular frameworks, the organic additives are able to allow the production of pure siliceous materials without the need for other chemical element besides silicon and oxygen. Examples of this are the materials known as silicalite-1 (MFI topology), siliceous sodalite (SOD topology), silicalite-2 (MEL topology), siliceous ZSM-12 (MTW topology), siliceous SSZ-23 (STT topology), siliceous sigma-2 (SGT topology), siliceous SSZ-48 (SFE topology), siliceous RUB-3 (RTE topology), etc.

The present invention provides a new crystalline silicate material and compositions derived therefrom, as well as methods for making and using such material. The crystalline silicate composition of the present invention has a distinct X-ray diffraction pattern that differentiates it from other zeolitic materials.

SUMMARY OF THE INVENTION

In accordance with the present invention, a porous crystalline composition is provided having a molar composition as follows: $YO_2$:m $X_2O_3$:n ZO, wherein Y is a tetravalent element selected from the group consisting of silicon, germanium, tin, titanium and combinations thereof, X is a trivalent element selected from the group consisting of aluminum, gallium, boron, iron and combinations thereof, Z is a divalent element selected from the group consisting of magnesium, zinc, cobalt, manganese, nickel and combinations thereof, m is between about 0 and about 0.5, n is between about 0 and about 0.5; and the composition has an x-ray diffraction pattern substantially as follows:

| Interplanar d-Spacing (Å) | Relative Intensity |
|---|---|
| 9.26 ± 0.50 | S-VS |
| 7.72 ± 0.20 | VW |
| 6.88 ± 0.20 | S-VS |
| 6.16 ± 0.20 | VW |
| 5.52 ± 0.15 | VW |
| 4.86 ± 0.15 | VW |
| 4.74 ± 0.15 | VW |
| 4.62 ± 0.15 | VW |
| 4.48 ± 0.10 | W |
| 4.38 ± 0.10 | VW |
| 4.10 ± 0.10 | VW |
| 3.90 ± 0.10 | W |
| 3.85 ± 0.10 | W |
| 3.83 ± 0.08 | W |
| 3.70 ± 0.08 | W |
| 3.44 ± 0.08 | S |
| 3.43 ± 0.08 | S |
| 3.33 ± 0.08 | W |
| 3.25 ± 0.08 | W |
| 3.22 ± 0.08 | VW |
| 3.08 ± 0.08 | VW |
| 2.99 ± 0.06 | VW |
| 2.89 ± 0.06 | VW |
| 2.81 ± 0.06 | VW |
| 2.75 ± 0.06 | VW |
| 2.66 ± 0.06 | VW |
| 2.55 ± 0.06 | VW |
| 2.44 ± 0.06 | VW |
| 2.43 ± 0.06 | VW |
| 2.38 ± 0.06 | VW |
| 2.26 ± 0.05 | VW |
| 2.22 ± 0.05 | VW |
| 2.14 ± 0.05 | VW |
| 2.12 ± 0.05 | VW |
| 2.05 ± 0.05 | VW |
| 2.03 ± 0.05 | VW | wherein VS = very strong, S = strong, M = middle, W = weak, and VW = very weak.

wherein VS=very strong, S=strong, M=middle, W=weak, and VW=very weak.

In further accordance with the invention, a method is provided for making a crystalline composition, which method comprises the steps of providing a reaction mixture of a source of a tetravalent element (Y) selected from the group consisting of silicon, germanium, tin, titanium and combinations thereof and a source of an organic template, and crystallizing the mixture so as to provide the crystalline composition.

In further accordance with the present invention, the composition can advantageously be used in a process for catalytically converting an organic compound, comprising the steps of providing an organic compound, providing a porous crystalline composition having a molar composition and X-ray diffraction pattern as set forth above, and contacting the organic compound and the crystalline composition at conversion conditions so as to convert the organic compound to a desired product.

DETAILED DESCRIPTION

Figure 1:
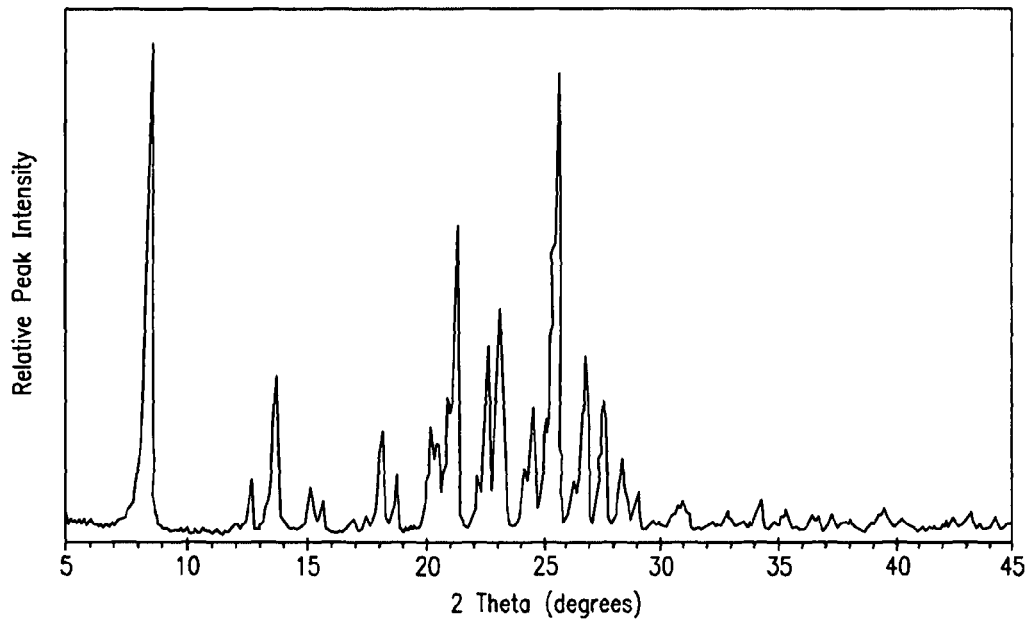
FIG. 1 is an X-ray diffraction pattern of the as-synthesized siliceous product of Example 1.
Figure 2:
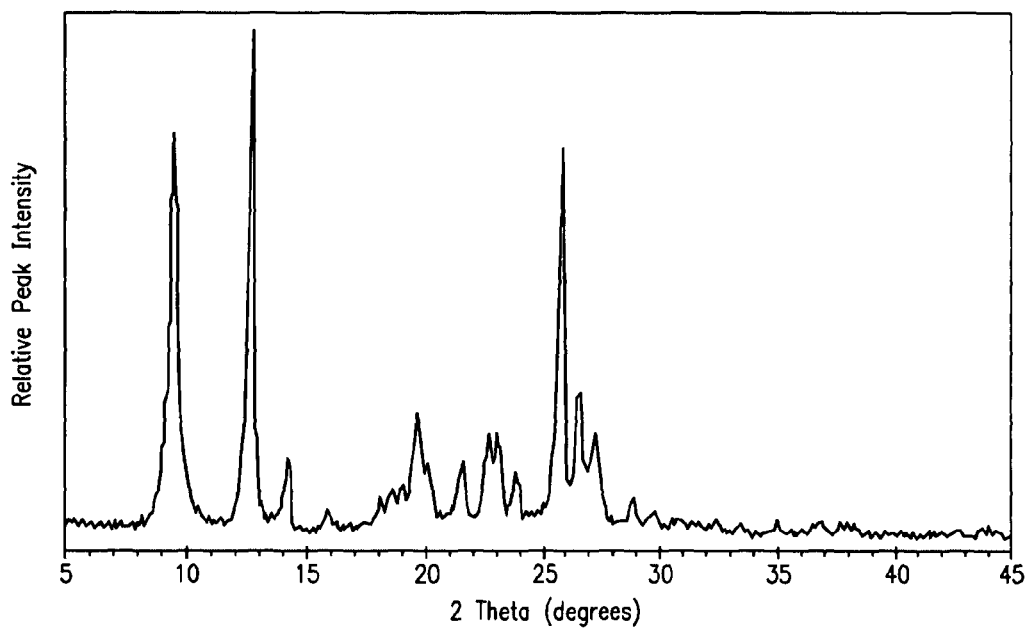
FIG. 2 is an X-ray diffraction pattern of the calcined siliceous product of Example 1.
Figure 3:
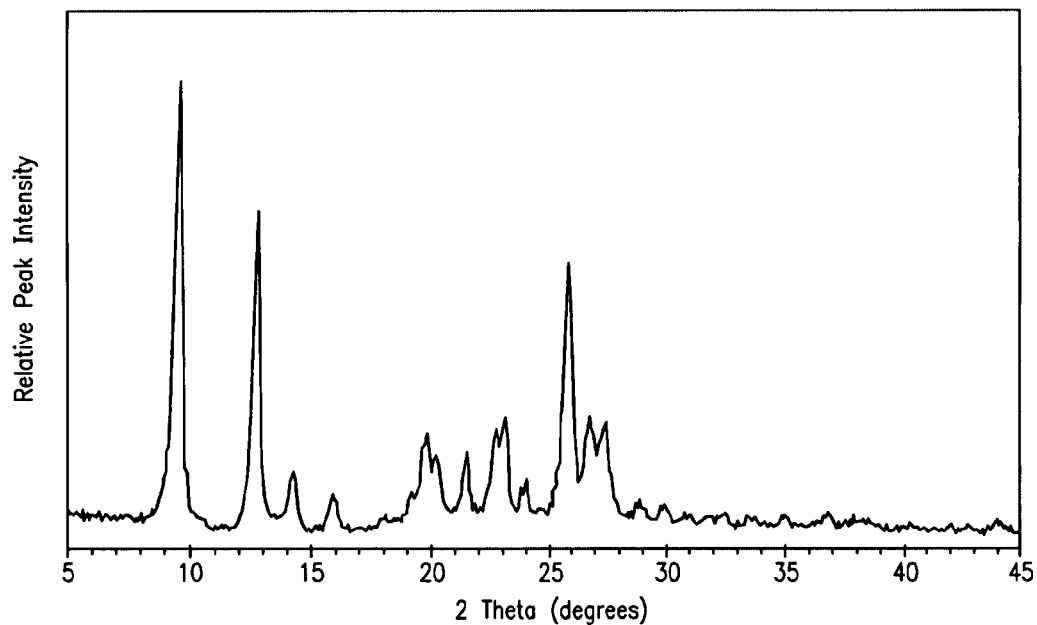
FIG. 3 is an X-ray diffraction pattern of the calcined magnesosilicate product of Example 2.
Figure 4:
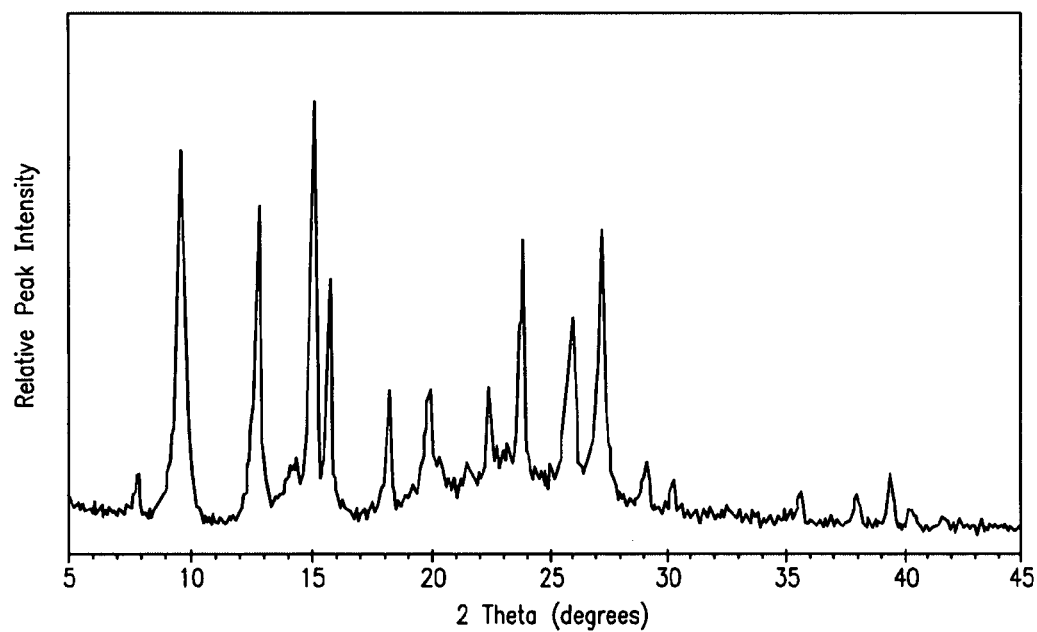
FIG. 4 is an X-ray diffraction pattern of the calcined aluminosilicate product of Example 3.
Figure 5:
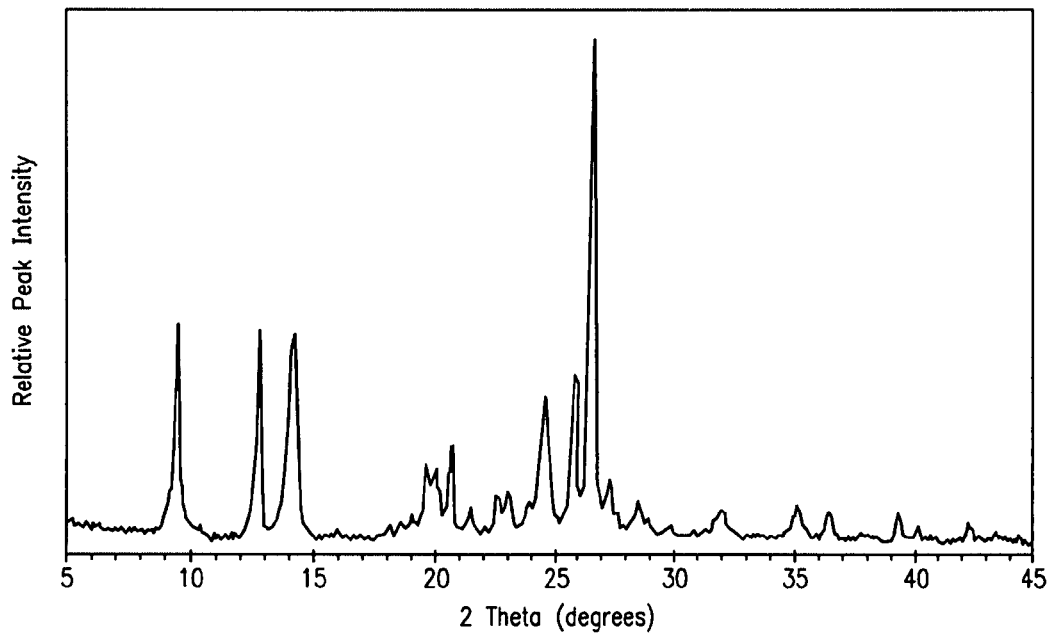
FIG. 5 is an X-ray diffraction pattern of the calcined aluminomagnesosilicate product of Example 4.
Figure 6:
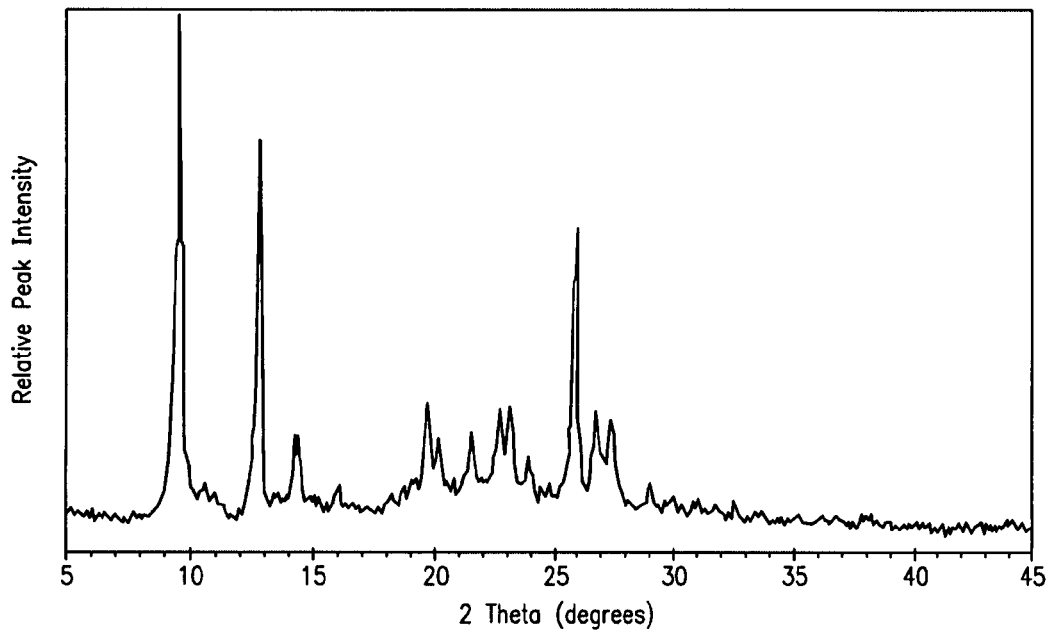
FIG. 6 is an X-ray diffraction pattern of the calcined boromagnesosilicate product of Example 5.
Figure 7:
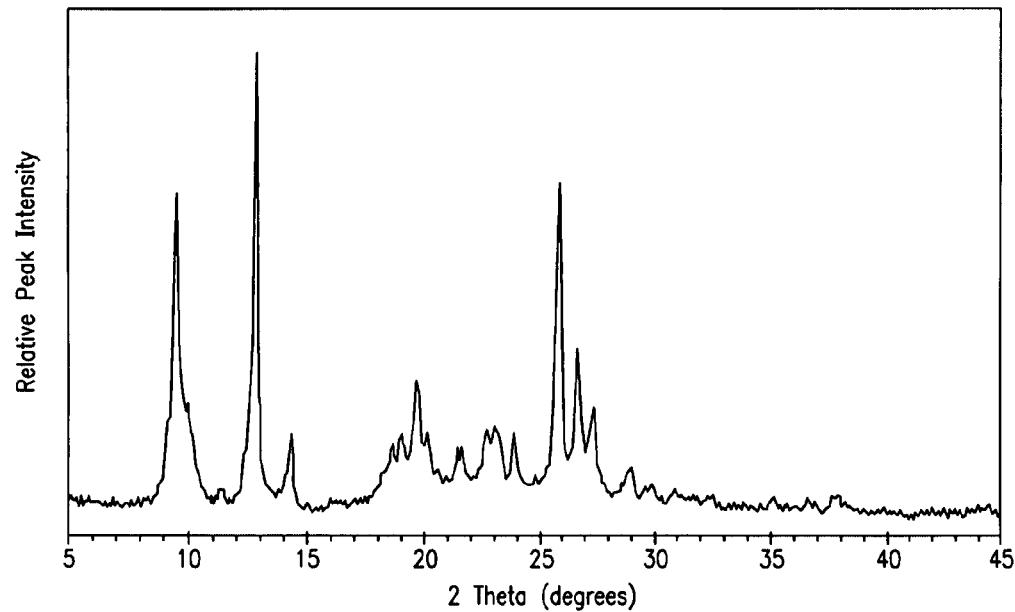
FIG. 7 is an X-ray diffraction pattern of the calcined zincosilicate product of Example 6.

The present invention is directed to a novel porous crystalline material, named IPZ-K, which in its calcined form is characterized by a unique X-ray diffraction pattern, which distinguishes it from other crystalline materials. The X-ray diffraction pattern includes values substantially as set forth in Table 1 below. The novel material has a composition comprising the molar relationship:

$YO_2:mX_2O_3:nZO$ wherein Y is a tetravalent element selected from the group consisting of silicon, germanium, tin, titanium and mixtures thereof, X is a trivalent element selected from the group consisting of aluminum, gallium, boron, iron, and mixtures thereof, Z is a divalent element selected from the group consisting of magnesium, zinc, cobalt, manganese, nickel and mixtures thereof, and wherein m is from 0 to about 0.5 and n is from 0 to about 0.5.

The invention further resides in a method for the preparation of the material, and the conversion of organic compounds contacted with an active form of the material.

In the as-synthesized form, the material has a chemical formula, on an anhydrous basis and in terms of mole ratio of oxides, as follows:

$aM_2O:bR:YO_2:mX_2O_3:nZO$ wherein M is an inorganic cation such as sodium, potassium, lithium, or mixtures thereof, preferably sodium, wherein R is an organic moiety of the tetraalkylammonium family, preferably tetramethylammonium ($TMA^+$), wherein a is from 0 to 0.2 and b is from to 0.01 to 0.18. The M and R components are associated with the material as a result of their presence in the crystallization gel, and are easily removed by post-crystallization methods hereinafter more particularly described.

The crystalline material of the present invention can be synthesized with only tetravalent chemical elements without the presence of trivalent and/or divalent chemical elements in which case the chemical formula, on an anhydrous basis and in terms of mole ratio of oxides is the following:

$bR:YO_2$

The crystalline material of the present invention can be synthesized with tetravalent and trivalent chemical elements without the presence of divalent chemical elements in which case the chemical formula, on an anhydrous basis and in terms of mole ratio of oxides is the following:

$aM_2O:bR:YO_2:mX_2O_3$

The crystalline material of the present invention can be synthesized with tetravalent and divalent chemical elements without the presence of trivalent chemical elements in which case the chemical formula, on an anhydrous basis and in terms of mole ratio of oxides is the following:

$aM_2O:bR:YO_2:nZO$

The novel crystalline material of the present invention is thermally stable and in the calcined form exhibits textural properties which makes it particularly useful in processes of catalytic conversion of organic compounds or as sorbent. The original alkaline cation of the as-synthesized material can be replaced in accordance with techniques well known in the art, by ion exchange with other types of cations. The preferred replacing cations include metal ions, hydrogen ions, hydrogen precursor ions (ammonium ions, for instance), and mixtures thereof. The cations preferred for ion exchange are those which tailor the desired catalytic activity for certain hydrocarbon conversion reactions. These include hydrogen, rare earth metals and metals of the periodic table groups IB, IIB, IIIB, IVB, IIA, IIIA, IVA, and VIII.

The novel crystalline material IPZ-K of the present invention has an X-ray diffraction pattern in the calcined form which distinguishes it from the patterns of other known as-synthesized or thermally treated crystalline materials including the lines listed in Table 1.

TABLE 1

| Interplanar d-Spacing (Å) | Relative Intensity |
| --- | --- |
| 9.26 ± 0.50 | S-VS |
| 7.72 ± 0.20 | VW |
| 6.88 ± 0.20 | S-VS |
| 6.16 ± 0.20 | VW |
| 5.52 ± 0.15 | VW |
| 4.86 ± 0.15 | VW |
| 4.74 ± 0.15 | VW |
| 4.62 ± 0.15 | VW |
| 4.48 ± 0.10 | W |
| 4.38 ± 0.10 | VW |
| 4.10 ± 0.10 | VW |
| 3.90 ± 0.10 | W |
| 3.85 ± 0.10 | W |
| 3.83 ± 0.08 | W |
| 3.70 ± 0.08 | W |
| 3.44 ± 0.08 | S |
| 3.43 ± 0.08 | S |
| 3.33 ± 0.08 | W |
| 3.25 ± 0.08 | W |
| 3.22 ± 0.08 | VW |
| 3.08 ± 0.08 | VW |
| 2.99 ± 0.06 | VW |
| 2.89 ± 0.06 | VW |
| 2.81 ± 0.06 | VW |
| 2.75 ± 0.06 | VW |
| 2.66 ± 0.06 | VW |
| 2.55 ± 0.06 | VW |
| 2.44 ± 0.06 | VW |
| 2.43 ± 0.06 | VW |
| 2.38 ± 0.06 | VW |

TABLE 1-continued

| Interplanar d-Spacing (Å) | Relative Intensity |
|---|---|
| 2.26 ± 0.05 | VW |
| 2.22 ± 0.05 | VW |
| 2.14 ± 0.05 | VW |
| 2.12 ± 0.05 | VW |
| 2.05 ± 0.05 | VW |
| 2.03 ± 0.05 | VW | wherein VS = very strong, S = strong, M = middle, W = weak, and VW = very weak.

A Philips diffractometer was employed to obtain the X-ray diffraction data, using copper K-alpha radiation. The conditions for acquisition of the data were as follows: a step scanning of 0.05 degrees of two-theta (theta is the Bragg angle), and a counting time of 1 second for each step. The units of the interplanar spacings, d's, were calculated in Angstroms (Å). The relative intensity of each line ($I/I_o$) is one-hundredth of the intensity of the strongest line, above the background, and they were derived with the help of a profile fitting routine, which came with the equipment software. The intensities reported are uncorrected for Lorentz and polarization effects.

The values of d's and relative intensities reported in Table 1 are a simple guide to identify by X-ray diffraction a family of materials of the present invention denoted as IPZ-K. It is well known that for a given zeolitic topology or framework type (for instance MTW), the X-ray diffraction intensities might vary according to some factors related to the material per se or to the thermal or hydrothermal history of such material. The intensities could vary because of the nature and degree of pore filling (presence or not of organic templates, degree of water or compounds filling), because of the incorporation of other heteroatoms in the framework structure or because of the type of extraframework cations. These effects can also produce crystallographic changes like minor changes in unit cell parameters (reflected in minor shifts of the d values) and/or crystal symmetry without a change in the crystalline structure. The sizes of the crystallites can also affect the X-ray diffraction pattern changing the width of the peaks and occulting some signals or showing new ones. The morphology of the crystals can also alter the intensities of the diffraction peaks (for instance, plate-like crystals tend to produce preferential orientation, which in turn can affect the intensities if care is not taken). For all those reasons, it should be understood that diffraction data listed for the calcined IPZ-K material in Table 1, as single lines, may consist of multiple overlapping lines, which under certain conditions, such as differences in crystallographic changes, may appear as resolved or partially resolved lines and, in the same way, the intensities can be affected by all the reasons discussed previously.

Preferentially, the as-synthesized material is calcined to remove all or part of the organic template. This thermal treatment is generally performed by heating at a temperature of at least about 450° C. for at least 1 minute and generally no longer than 24 hours. For convenience, atmospheric pressure is desired for the thermal treatment. The thermal treatment can be performed at a temperature up to about 1000° C.

Figure 8:
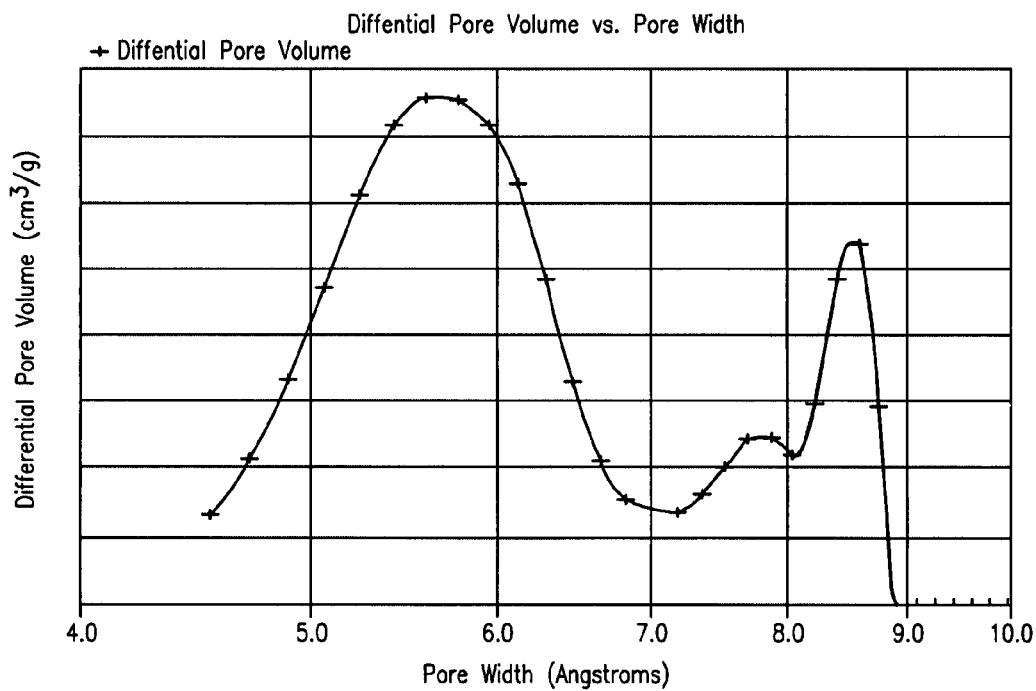
FIG. 8 illustrates differential pore volume as a function of the pore width for the calcined material of Example 1.
Figure 9:
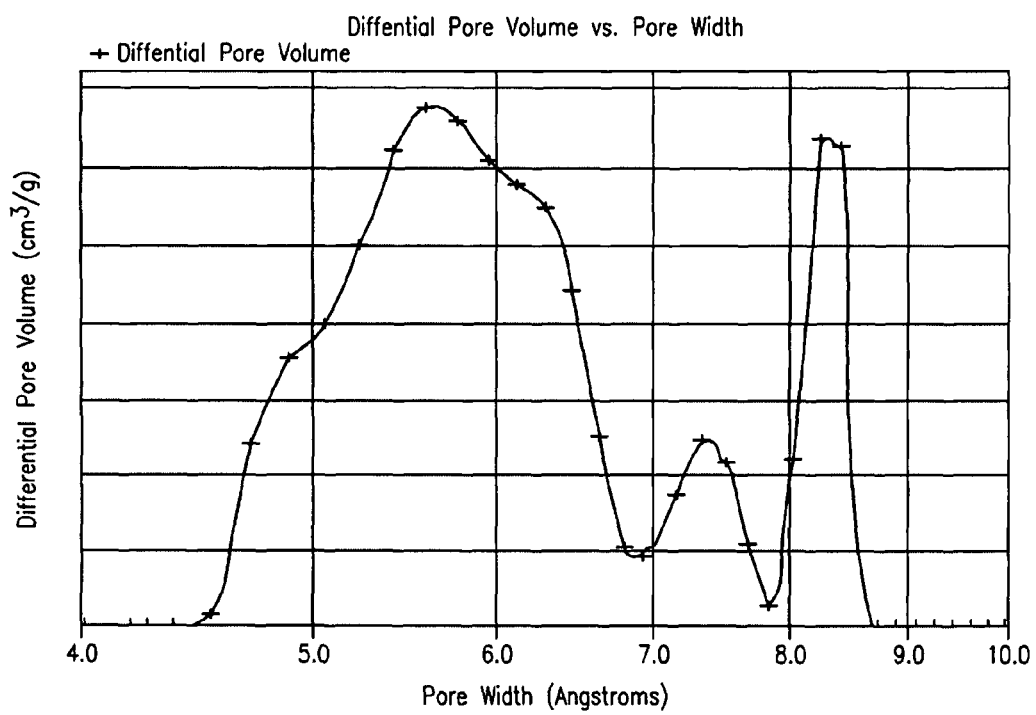
FIG. 9 illustrates differential pore volume as a function of the pore width for the calcined material of Example 2.
Figure 10:
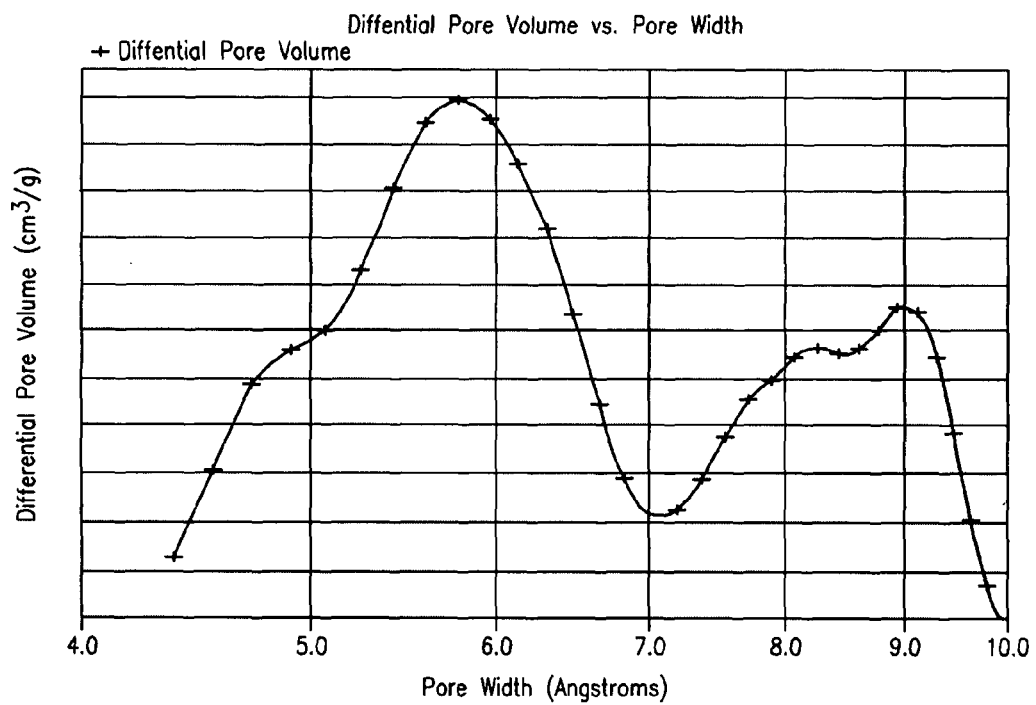
FIG. 10 illustrates differential pore volume as a function of the pore width for a calcined material known as ZSM-5 (MFI topology)

An important parameter for the practical use of zeolitic materials resides in how big is the pore width of the material, which in turn will allow, or not allow, the access of certain molecules (the so called molecular sieve effect). To get an estimate of such value for the IPZ-K type materials, we use the adsorption of $CO_2$ molecules combined with Differential Functional Theory (DFT). The results for the calcined samples of Examples 1 and 2 are shown in FIG. 8 and FIG. 9, respectively. As a comparison, the result of the well-known material ZSM-5 (MFI topology) is shown in FIG. 10. It is well known that the average size of the pore width of the ZSM-5 material is around 5.5-5.7 Å and that this material has two distinct systems of channels, which interconnect each other producing cavities larger than 7 Å. As can be seen in FIG. 10, the ZSM-5 material tested shows a pore width around 5.6 Å, which is between the expected range for this type of material. Also, there are pore widths between 8 and 9 Å which are expected for the cavities formed by the interconnecting channels of this material.

For the siliceous calcined material of Example 1 (FIG. 8), it is possible to see that this material also has an average pore width around 5.5 Å and it seems that the presence of cavities larger than 7 Å for the IPZ-K type materials is possible. As expected, the incorporation of other chemical elements in the framework of the siliceous IPZ-K material produces distortions because of the difference in atomic sizes of the elements incorporated within the structure. Those distortions can be observed in the pore width of the calcined material of Example 2 which contains magnesium (FIG. 9).

The novel crystalline materials of the present invention have useful properties including catalytic activity. These novel crystalline compositions may be advantageously employed in known processes, which presently use aluminosilicate zeolites. The novel crystalline compositions of the present invention may advantageously be incorporated with binders, clays, aluminas, silicas, or other materials, which are well known in the art. They also can be modified with one or more elements or compounds by deposition, occlusion, ion-exchange or other techniques known to those skilled in the art to enhance, supplement or alter the properties or usefulness of the novel crystalline compositions of the present invention. The novel crystalline compositions of the present invention can be used as additives in the FCC area.

The novel crystalline materials of the present invention can be prepared from a reaction mixture containing sources of a tetravalent element (Y) such as silicon, germanium, tin, titanium, or mixtures thereof, preferably silicon, a source of alkali ions (M), such as sodium, potassium, lithium, or mixtures thereof, preferably sodium cations, a source of a trivalent element (X) such as aluminum, gallium, boron, iron, or mixtures thereof, a source of divalent elements (Z) such as magnesium, zinc, cobalt, manganese, nickel, or mixtures thereof, a source of organic template (R) such as tetraalkylammonium ions, preferably tetramethylammonium ions ($TMA^+$), and water, with the reaction mixture preferably having a composition, in terms of mole ratios of oxides, within the ranges shown in Table 2.

TABLE 2

| Mole Ratio of Reactants | Useful range | Preferred range |
|---|---|---|
| $ZO/YO_2$ | 0 to 0.5 | 0 to 0.2 |
| $X_2O_3/YO_2$ | 0 to 0.5 | 0 to 0.2 |
| $M_2O/YO_2$ | 0 to 10 | 0 to 5 |
| $R/YO_2$ | 0.01 to 3 | 0.1 to 1.2 |
| $H_2O/YO_2$ | 1 to 100 | 5 to 30 |

The preferred sources of $YO_2$ comprise colloidal silica, sodium silicate, sodium metasilicate, fume silica, silicon oxide and/or clays. The preferred sources of ZO comprise soluble salts, hydroxides and/or oxides of magnesium, zinc, cobalt, manganese and/or nickel. The preferred sources of $X_2O_3$ comprise soluble salts, hydroxides, and/or oxides of aluminum, gallium, boron and/or iron. The preferred sources of R are tetraalkylammonium salts and/or hydroxides. The preferred sources of M are salts, oxides and/or hydroxides of sodium, potassium and/or lithium.

Preparation of the crystallization gel or mixture does not require a preferred ordering in the addition of the reactants. The crystallization can be carried out at either static or stirred conditions in a suitable reactor vessel, such as for example, stainless steel autoclaves. The total useful range of temperatures required for crystallization is from about 80° C. to about 250° C. for a period of time sufficient to complete crystallization at the given temperature, for instance, from about 6 hours to about 30 days. The crystallization is carried out preferably at autogenous pressure. After crystallization occurs, the crystals are separated from the mother liquor, washed with water and dried.

The addition of seed crystals from a previous crystallization batch to a new reaction mixture may facilitate the crystallization of new material. Preferred amounts of seed crystals may vary, preferably between about 0.1 and about 3% of the total weight of the reaction mixture. As can be understood by those skilled in the art, the reaction mixture components can be supplied by more than one source, and the crystal size and crystallization time of the new crystalline material can be varied with the nature of the reaction mixture and the crystallization conditions employed.

The new crystalline materials of the present invention and their preparation method will be better understood by reference to the following example.

EXAMPLE

The following procedures were conducted to obtain different compositions of the crystalline material of the present invention (IPZ-K). In these procedures, the following reactants were used: colloidal silica sol (40 wt. % $SiO_2$), magnesium nitrate, aluminum nitrate, zinc nitrate, boric acid, sodium hydroxide, tetramethylammonium hydroxide and distilled water. The salts were dissolved in the distilled water and mixed with the colloidal silica sol. There is no preferred order of mixture for this synthesis. The mixture is stirred to produce 6 samples having a uniform fluid gel having the molar compositions shown in Table 3.

TABLE 3

MIXTURE COMPOSITION (MOLE RATIOS)

| Sample | MgO/$SiO_2$ | $Al_2O_3$/$SiO_2$ | $B_2O_3$/$SiO_2$ | ZnO/$SiO_2$ | $Na_2O$/$SiO_2$ | TMA/$SiO_2$ | $H_2O$/$SiO_2$ |
|---|---|---|---|---|---|---|---|
| 1 | 0.0000 | 0.0000 | 0.0000 | 0.0000 | 0.1546 | 0.7121 | 15.918 |
| 2 | 0.0348 | 0.0000 | 0.0000 | 0.0000 | 0.1621 | 0.7809 | 15.932 |
| 3 | 0.0000 | 0.0189 | 0.0000 | 0.0000 | 0.1833 | 0.7532 | 15.956 |
| 4 | 0.0348 | 0.0076 | 0.0000 | 0.0000 | 0.1552 | 0.7829 | 18.743 |
| 5 | 0.0348 | 0.0000 | 0.0097 | 0.0000 | 0.1633 | 0.8103 | 18.523 |
| 6 | 0.0000 | 0.0000 | 0.0000 | 0.0040 | 0.1861 | 0.7044 | 15.912 |

The mixture of each sample was transferred into a 300-ml stainless steel autoclave equipped with a stirrer. The autoclave was capped and sealed, and stirring and heating were started. Crystallization for each experiment was carried out under the conditions shown in Table 4 at autogenous pressure.

Crystalline products were filtered, washed with distilled water, and dried in an oven at 120° C. for 12 hours. The X-ray diffraction pattern of the as-synthesized material of Example 1 is shown in FIG. 1. Samples of the dried crystalline products of each experiment were calcined in a furnace with air at 600° C. for 6 hours. The X-ray diffraction patterns of each calcined sample are shown in FIGS. 2 to 7.

TABLE 4

CRYSTALLIZATION CONDITIONS AND PRODUCT TYPE

| Sample | Time (h) | Temperature (° C.) | Stirring | Product Type |
|---|---|---|---|---|
| 1 | 144 | 180 | Yes | Siliceous IPZ-K |
| 2 | 156 | 180 | Yes | Magnesosilicate IPZ-K |
| 3 | 156 | 180 | Yes | Aluminosilicate IPZ-K |
| 4 | 180 | 180 | Yes | Aluminomagnesosilicate IPZ-K |
| 5 | 170 | 180 | Yes | Boromagnesosilicate IPZ-K |
| 6 | 200 | 170 | Yes | Zincosilicate IPZ-K |

Table 5 shows the chemical formula expressed as mole ratio of oxides on an anhydrous basis for the as-synthesized materials of Samples 1-6.

TABLE 5

| Sample | Chemical formula of the as-synthesized material IPZ-K |
|---|---|
| 1 | 0.085 TMA:$SiO_2$ |
| 2 | 0.002 $Na_2O$:0.093 TMA:$SiO_2$:0.047 MgO |
| 3 | 0.008 $Na_2O$:0.073 TMA:$SiO_2$:0.026 $Al_2O_3$ |
| 4 | 0.003 $Na_2O$:0.091 TMA:$SiO_2$:0.010 $Al_2O_3$:0.045 MgO |
| 5 | 0.003 $Na_2O$:0.089 TMA:$SiO_2$:0.012 $B_2O_3$:0.049 MgO |
| 6 | 0.002 $Na_2O$:0.094 TMA:$SiO_2$:0.051 ZnO |

It is apparent that there has been provided in accordance with the present invention a crystalline composition, preparation and use which fully satisfies the objects, means, and advantages set forth previously herein. While the present invention has been described in the context of specific embodiments thereof, other alternatives, modifications, and variations will become apparent to those skilled in the art having read the foregoing description.

Accordingly, it is intended to embrace those alternatives, modifications, and variations as fall within the broad scope of the appended claims.

What is claimed is:

1. A method for making a crystalline composition, comprising the steps of:

providing a reaction mixture of a source of a tetravalent element (Y) selected from the group consisting of silicon, germanium, tin, titanium and combinations thereof; a trivalent element (X) selected from the group consisting of aluminum, gallium, boron, iron and combinations thereof and a divalent element (Z) selected from the group consisting of magnesium, zinc, cobalt, manganese, nickel and combinations thereof; and a source of an organic template; and crystallizing said mixture so as to provide a porous crystalline composition having a molar composition as follows:

$YO_2$:$mX_2O_3$:$nZO$, wherein

Y is a tetravalent element selected from the group consisting of silicon, germanium, tin, titanium and combinations thereof;

X is a trivalent element selected from the group consisting of aluminum, gallium, boron, iron and combinations thereof;

Z is a divalent element selected from the group consisting of magnesium, zinc, cobalt, manganese, nickel and combinations thereof;

m is between about 0 and about 0.5;

n is between about 0 and about 0.5; and said composition has an x-ray diffraction pattern substantially as follows:

| Interplanar d-Spacing (Å) | Relative Intensity |
| --- | --- |
| 9.26 ± 0.50 | S-VS |
| 7.72 ± 0.20 | VW |
| 6.88 ± 0.20 | S-VS |
| 6.16 ± 0.20 | VW |
| 5.52 ± 0.15 | VW |
| 4.86 ± 0.15 | VW |
| 4.74 ± 0.15 | VW |
| 4.62 ± 0.15 | VW |
| 4.48 ± 0.10 | W |
| 4.38 ± 0.10 | VW |
| 4.10 ± 0.10 | VW |
| 3.90 ± 0.10 | W |
| 3.85 ± 0.10 | W |
| 3.83 ± 0.08 | W |
| 3.70 ± 0.08 | W |
| 3.44 ± 0.08 | S |
| 3.43 ± 0.08 | S |
| 3.33 ± 0.08 | W |
| 3.25 ± 0.08 | W |
| 3.22 ± 0.08 | VW |
| 3.08 ± 0.08 | VW |
| 2.99 ± 0.06 | VW |
| 2.89 ± 0.06 | VW |
| 2.81 ± 0.06 | VW |
| 2.75 ± 0.06 | VW |
| 2.66 ± 0.06 | VW |
| 2.55 ± 0.06 | VW |
| 2.44 ± 0.06 | VW |
| 2.43 ± 0.06 | VW |
| 2.38 ± 0.06 | VW |
| 2.26 ± 0.05 | VW |
| 2.22 ± 0.05 | VW |
| 2.14 ± 0.05 | VW |
| 2.12 ± 0.05 | VW |
| 2.05 ± 0.05 | VW |
| 2.03 ± 0.05 | VW | wherein VS = very strong, S = strong, M = middle, W = weak, and VW = very weak.

2. The method of claim 1, wherein said reaction mixture further comprises a source of alkali ions (M) selected from the group consisting of sodium, potassium, lithium and combinations thereof.

3. The method of claim 1, wherein said organic template is tetralkylammonium ions.

4. The method of claim 1, wherein said organic template is tetramethylammonium ions ($TMA^+$).

5. The method of claim 1, wherein said crystallizing step is carried out at a temperature of between about 80° C. and about 250° C. for a period of time sufficient to crystallize said reaction mixture.

6. The method of claim 5, wherein said crystallizing step is further carried out at autogenous pressure.

7. The method of claim 1, wherein said reaction mixture further contains seed crystals of said crystalline composition.

8. The method of claim 1, wherein said crystallizing step produces a synthesized composition containing organic moieties of said organic template, and further comprising calcining said synthesized composition to provide said porous crystalline composition.

* * * * *